(12) United States Patent
Bottomley

(10) Patent No.: US 6,473,602 B1
(45) Date of Patent: Oct. 29, 2002

(54) MOBILE ASSISTED HANDOFF IN RADIOCOMMUNICATION SYSTEMS

(75) Inventor: Gregory E. Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/740,306

(22) Filed: Oct. 28, 1996

(51) Int. Cl.[7] ................................................. H04B 1/38
(52) U.S. Cl. .................... 455/226.1; 455/67.1; 375/260
(58) Field of Search .............................. 455/67.1, 67.3, 455/226.1, 226.2, 437, 302, 280, 338; 370/210, 330, 335, 342, 344, 337, 347; 375/260, 227

(56) References Cited

U.S. PATENT DOCUMENTS

| | | | |
|---|---|---|---|
| 4,608,711 A | 8/1986 | Goldman | 455/33.2 |
| 4,696,027 A | 9/1987 | Bonta | 379/60 |
| 4,723,303 A | 2/1988 | Koch | 455/67.1 |
| 4,736,453 A | 4/1988 | Schloemer | 455/33.2 |
| 4,765,753 A | 8/1988 | Schmidt | 379/60 |
| 4,783,780 A | 11/1988 | Alexis | 370/95.1 |
| 4,794,635 A | 12/1988 | Hess | 379/60 |
| 4,811,380 A | 3/1989 | Spear | 379/60 |
| 4,866,170 A | 9/1989 | Ohshiro | 370/95.1 |
| 4,977,612 A | 12/1990 | Wilson | 455/166.1 |
| 5,042,082 A | 8/1991 | Dahlin | 455/33.1 |
| 5,050,166 A | 9/1991 | Cantoni et al. | 370/94.1 |
| 5,093,924 A | 3/1992 | Toshiyuki et al. | 455/67.1 |
| 5,175,867 A | 12/1992 | Wejke et al. | 455/33.1 |
| 5,179,722 A | 1/1993 | Gunmar et al. | 455/33.1 |
| 5,212,684 A | 5/1993 | MacNamee et al. | 370/24 |
| 5,216,692 A * | 6/1993 | Ling | 375/1 |
| 5,220,562 A | 6/1993 | Takada et al. | 370/85.13 |
| 5,239,676 A | 8/1993 | Strawczynski et al. | 455/33.2 |
| 5,260,943 A | 11/1993 | Comroe et al. | 370/95.1 |
| 5,345,598 A * | 9/1994 | Dent | 455/67.1 |
| 5,375,123 A | 12/1994 | Andersson et al. | 370/95.1 |
| 5,535,240 A * | 7/1996 | Carney et al. | 375/219 |
| 5,555,552 A * | 9/1996 | Kawaguchi | 455/226.1 |

FOREIGN PATENT DOCUMENTS

| | | |
|---|---|---|
| EP | 0 377 509 A | 7/1990 |
| EP | 0 595 781 A | 5/1994 |
| FR | 2 594 276 | 8/1987 |
| GB | 2 240 696 | 8/1991 |
| WO | WO91/07020 | 5/1991 |
| WO | WO96/13955 | 5/1996 |

OTHER PUBLICATIONS

"Cellular System Dual–Mode Mobile Station–Base Station Compatibility Standard", *EIA/TIA Interim Standard*, IS–54–B, pp. 8, 248–249.

"Cellular System Dual–Mode Mobile Station–Base Station Compatibility Standard", *EIA/TIA Interim Standard*, IS–54–B, pp. 101–106; 109–116; 139–140; and 63–166 (Apr. 1992).

* cited by examiner

Primary Examiner—Thanh Cong Le
(74) Attorney, Agent, or Firm—Myers Bigel Sibley & Sajovec

(57) ABSTRACT

Methods and apparatuses for radiocommunication systems including energy (e.g., signal strength) measurements are described. To enable measurements to be performed in parallel with information signal decoding and demodulation, a duplicate of a received signal can be made. The duplicate can be processed to enable measurement on any desired channel. Various access methodologies including FDMA, TDMA and CDMA are contemplated. The measurement information can then be reported to the system for usage in handoff determination. The inventive techniques allow for MAHO measurements to be performed without idle time being available for a receiver and without a dedicated scanning receiver being provided solely for measurement purposes.

23 Claims, 3 Drawing Sheets

MOBILE ASSISTED HANDOFF IN RADIOCOMMUNICATION SYSTEMS

BACKGROUND

The present invention relates generally to radiocommunication systems wherein signals are transmitted over an air interface and, more specifically, to performing mobile-assisted handoff (MAHO) measurements in such radiocommunication systems.

In wireless communications, channelization of the system bandwidth is used to provide a plurality of communications channels. The definition of a channel depends on the type of multiple access scheme employed. In frequency-division-multiple-access (FDMA), a channel refers to a subset of the total frequency spectrum available to the system. Thus, each channel is centered on a different frequency. In time-division-multiple-access (TDMA), each frequency is divided into a number of time slots and a channel refers to a particular one or more of those time slots. In code-division-multiple-access (CDMA), spreading codes are used to spread information symbols across the usable bandwidth and a channel refers to a particular spreading code used to spread and despread information symbols associated with a connection. The spreading codes consists of a sequence of values, commonly referred to as chips. Thus, a binary information symbol can be sent over the air interface in a CDMA system by transmitting either one chip sequence or another chip sequence depending upon the particular spreading code selected for that channel.

Often, hybrid systems exist which combine various access methodologies, such as FDMA/TDMA and FDMA/CDMA. In FDMA/TDMA systems there are multiple FDMA frequencies, and each frequency is used to transmit multiple time slots. In FDMA/CDMA systems there are multiple FDMA frequencies, and each frequency is used to transmit multiple codes. Hybrid FDMA/TDMA/CDMA systems are also possible.

Regardless of the multiple access scheme used, users are assigned channels for communication purposes. In cellular communication systems, users are allowed to move from one cell to the next during a call. To maintain call quality, the user is serviced from different base stations, depending on the base station(s) best able to support radiocommunications with that particular user. As a result, there are control mechanisms for handing off the call from one base station to the next, which mechanisms usually require switching from one communications channel to another.

Traditionally, these control mechanisms rely on information obtained from channel energy or power measurements made at the base stations using a scanning receiver to determine when handoffs should be performed. Since some of the first cellular systems used FDMA access schemes, the scanning receiver scanned different frequencies and made signal strength measurements. Measurements from multiple base stations were then examined at a central control point in the radiocommunication network to determine when and where handoffs should occur. These measurements were made only for one link of the communications channel, i.e. the uplink from the user to the base station.

More recently, digital cellular systems have been deployed in which measurements are also made on the downlink, i.e. on transmissions from the base station to the user. These measurements are made by the user's equipment and communicated back to the base station via a control channel. These measurements are referred to as mobile-assisted handoff (MAHO) measurements. MAHO measurements are economically feasible because these digital cellular systems are hybrid FDMA/TDMA. Thus, the mobile station would typically receive its downlink signal during one time slot and transmit its uplink signal during another time slot. However, each TDMA frame in these systems typically has more than two time slots, e.g., six or eight time slots per frame. These other time slots are typically allocated for usage as different communication channels as described above. Thus, a mobile station which is connected in this manner to an FDMA/TDMA system will be idle for several time slots during each frame. These idle time slots are available for making MAHO measurements. Thus, the same receiver hardware in the mobile station is used both for receiving the downlink signal and for making MAHO measurements.

However, such an approach is limited to systems which have a TDMA component in their access scheme and available idle time slots for making MAHO measurements. Otherwise, for example if the receiver must continuously monitor the downlink, then a separate receiver is required for making MAHO measurements, which adds significant cost and size to the user's terminal. Thus, there is a need for an alternative, efficient, cost-effective way of performing MAHO measurements in a wireless communications terminal.

SUMMARY

The present invention provides an efficient method for performing MAHO measurements in a wireless terminal. According to exemplary embodiments, the received signal is split at a point in the signal processing where the entire system band is available for high-speed digitization. A snapshot of this signal is digitized and then processed digitally to provide channelization and signal strength information. This information is then reported to the system for usage in making handoff determinations.

According to one exemplary embodiment of the present invention, a signal splitter is inserted downstream of the intermediate frequency generator in the receive signal processing path. One copy of the signal is processed conventionally to provide the information signal to the terminal's processor. Another copy of the signal is digitized, channelized and measured for signal strength (or bit error rate) to provide MAHO measurement information which is then transmitted back to the base station.

Various techniques for processing the signal to obtain the MAHO measurement information are described. According to one exemplary embodiment, a channelizer is provided which separates the channel (or channels) to be measured from other channels present in the received signal. The particular signal processing techniques applied in the channelizer will depend upon the multiple access technique associated with the system. The magnitude of the received signal is then determined and accumulated, providing an estimate of the signal strength for the selected channel(s).

According to another exemplary embodiment, a Fast Fourier Transform (FFT) processor is used to produce frequency channelized data streams for a plurality of frequencies. Depending upon the access methodology used, extraction devices may follow the FFT processor to support, for example, TDMA and CDMA access components. As in the previously described embodiment, the magnitude of the received signal is then determined and accumulated, providing an estimate of the signal strength for the selected channel(s).

BRIEF DESCRIPTION OF THE DRAWINGS

These and other objects, features and advantages of the present invention will be readily understood by those skilled in the art by reading the following detailed description in conjunction with the drawings, in which.

DETAILED DESCRIPTION

The present invention employs high speed analog-to-digital conversion technology in conjunction with digital signal processing to provide MAHO measurements for one or more channels in radiocommunication systems using an access scheme having an FDMA component. Thus, the following discussion applies to pure FDMA systems as well as hybrid systems, such as FDMA/TDMA, FDMA/CDMA, and FDMA/TDMA/CDMA. Prior to describing terminals according to the present invention, a brief description of cellular radiocommunication systems is provided below for context.

Figure 1:
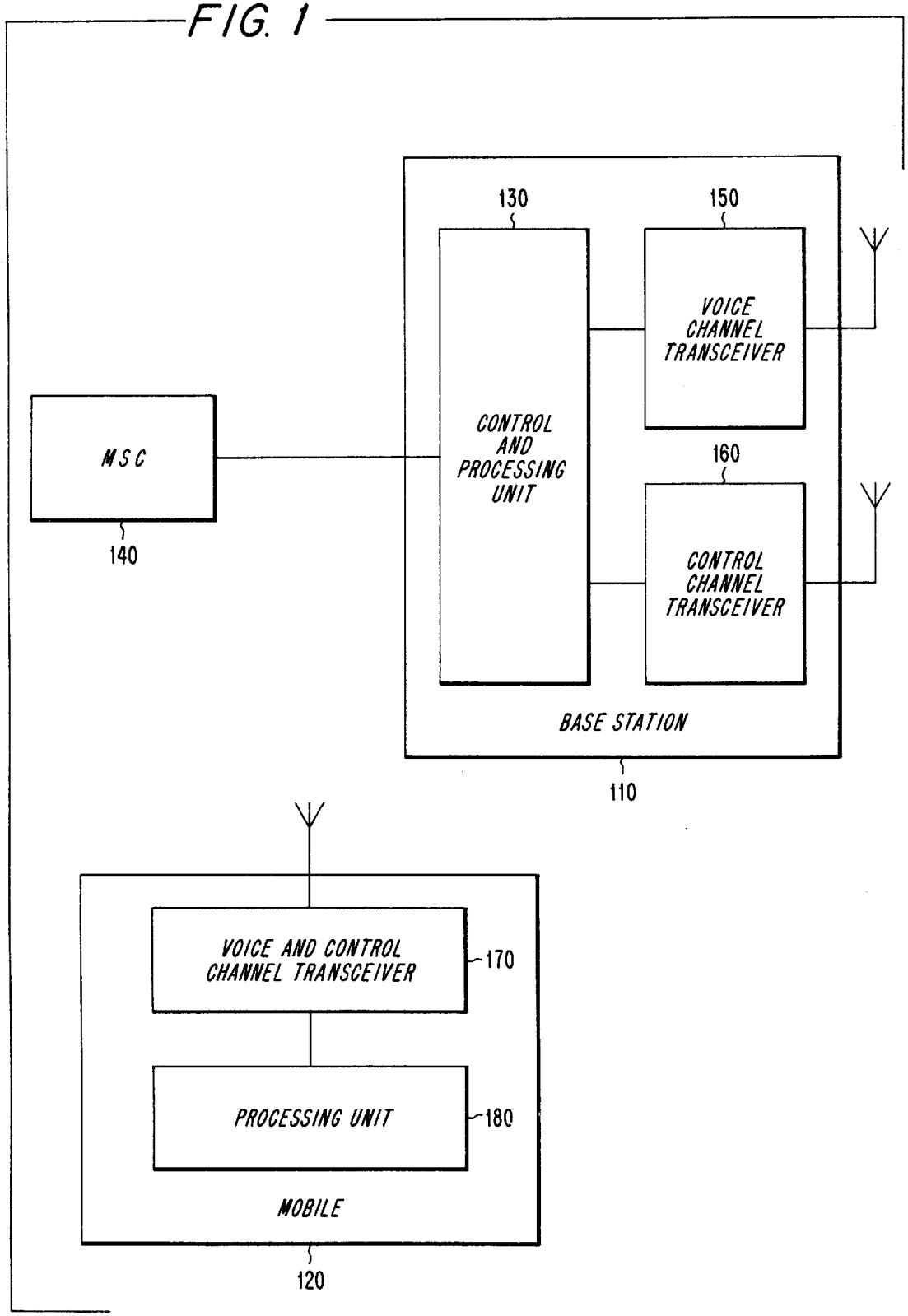
FIG. 1 is an exemplary block diagram representation of a base station and a mobile station.

FIG. 1 represents a block diagram of an exemplary cellular radiocommunication system, including an exemplary base station 110 and mobile station 120. The base station includes a control and processing unit 130 which is connected to the Mobile Switching Center (MSC) 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System" and U.S. patent application Ser. No. 07/967,027 entitled "Multi-Mode Signal Processing" which was filed on Oct. 27, 1992, both of which are incorporated in this application by reference.

The base station 110 handles one or more voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with, for example, digital control channels (DCCs) and digital traffic channels (DTCs) that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. When connected to the system via a traffic channel, the mobile station can be supplied with a list of channels on which to measure, e.g., using the fast associated control channel (FACCH) or the slow associated control channel (SACCH) as described in, for example, TIA/EIA IS-136. The MAHO measurements are then reported to base station 110, which can then use the information to perform a handoff of mobile station 120 from one channel to another. The structures and techniques for making these measurements according to the present invention will now be described.

Figure 2:
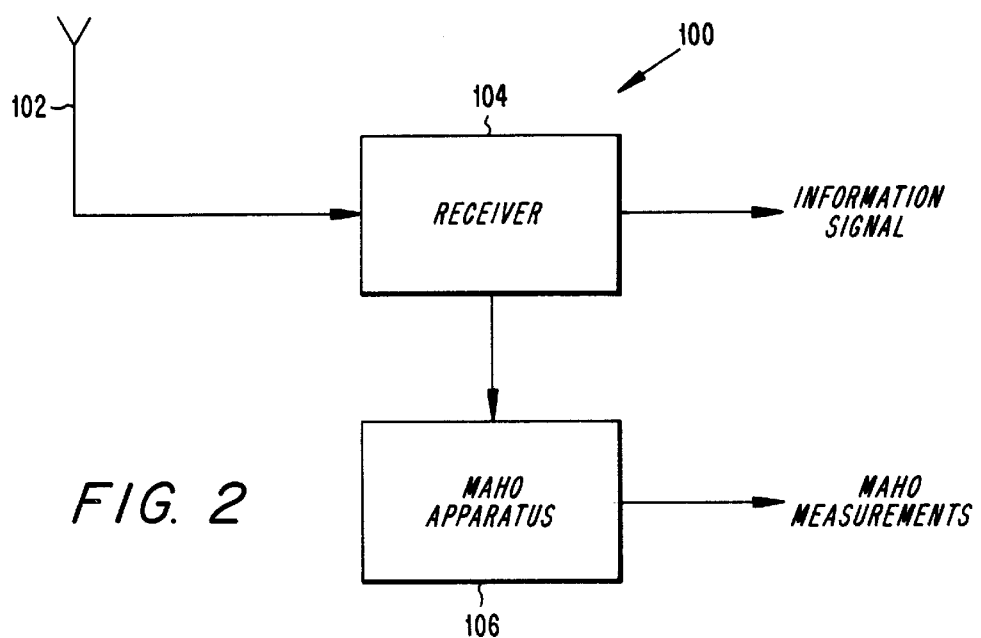
FIG. 2 is a block diagram of a terminal according to an exemplary embodiment.

An exemplary remote terminal (e.g., mobile station) according to the present invention is illustrated in FIG. 2, which shows a receiving system 100. System 100 includes an antenna 102 for receiving the signals in the system's frequency band. The receiver 104 provides various amplification, mixing and filtering stages, as well as signal demodulation, to produce the received information signal. These functional capabilities of receivers are well known to those skilled in the art and, therefore, will not be described further here. The MAHO apparatus 106 takes an intermediate signal from the receiver 104 and processes this signal to produce MAHO information. This information can then be supplied to the base station over a control channel.

Figure 3:
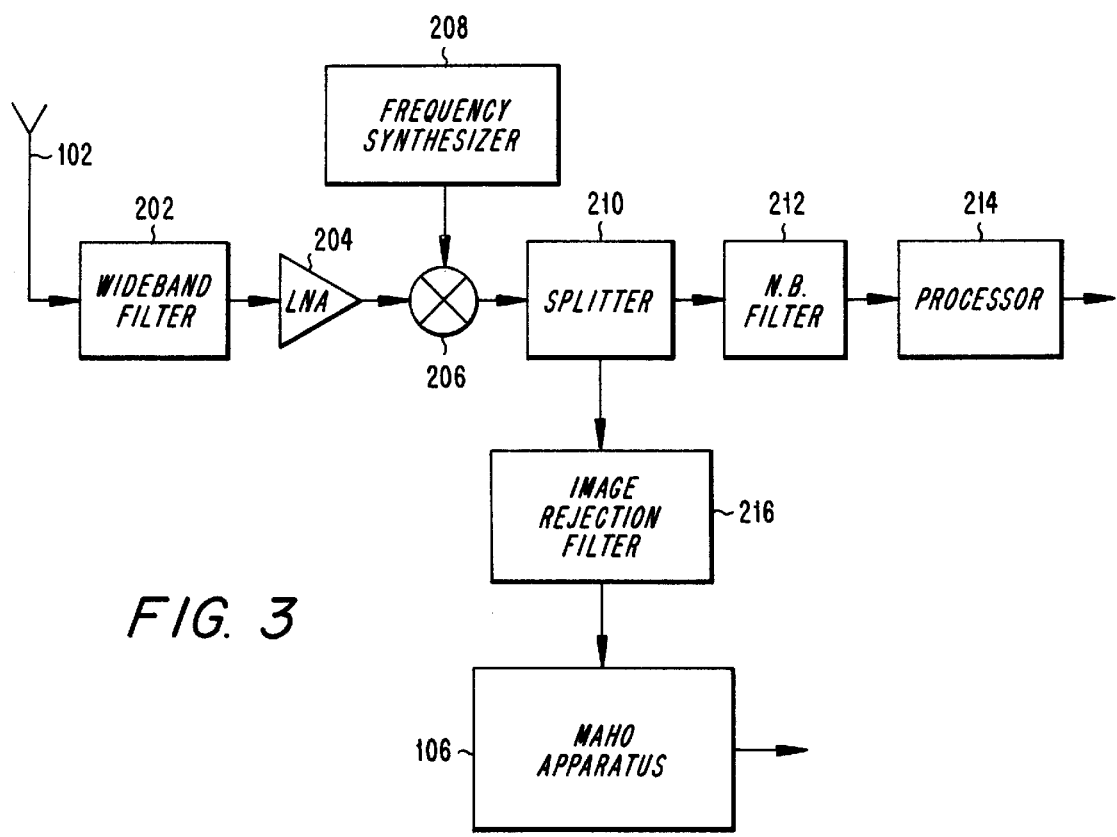
FIG. 3 is a block diagram of an exemplary receiver according to the present invention.

An example of system 100 is shown in FIG. 3. The signal from antenna 102 is first filtered by a wideband filter 202, which passes all frequencies of interest. The filtered signal, or bandlimited signal, is then amplified by a low-noise-amplifier (LNA) 204. Then, the amplified signal is mixed in mixer 206 with a signal from a frequency synthesizer 208, so that the mixed signal is at a desired intermediate frequency (IF). This mixed signal is split into two copies in splitter 210. One copy is filtered by narrowband filter 212 and other processing 214, which further amplifies, mixes, and filters the signal, finally demodulating it to produce the information signal. The other copy is filtered by an image rejection filter 216 before being sent to the MAHO apparatus 106. This filtering is used to remove the unwanted signal image produced by the mixer 206. If mixer 206 is an image reject mixer, then image rejection filter 216 may be omitted.

Figure 4:
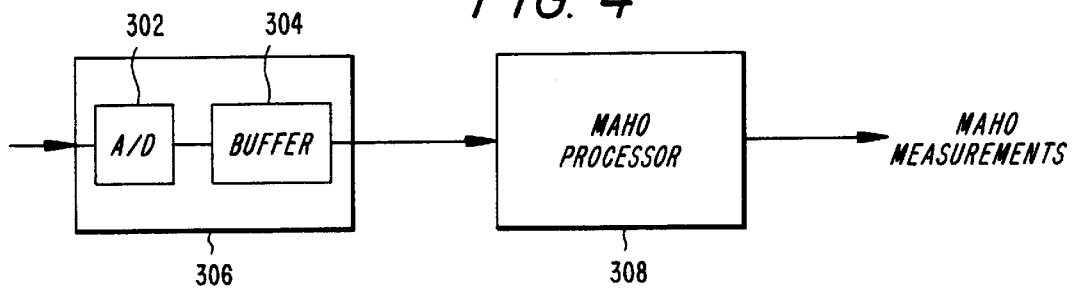
FIG. 4 is an exemplary block diagram of the MAHO apparatus of FIG. 3.

An exemplary MAHO apparatus 106 is illustrated in further detail in FIG. 4. The signal from the receiver is collected by the MAHO collector 306, which includes a high speed analog-to-digital (A/D) converter 302 followed by a buffer 304 for storing the digital samples. Control mechanisms, not shown in these figures, determine when and how many samples are taken and stored based upon the desired accuracy and frequency of the measurements. In general, only a fraction of the signal is collected for further processing, which occurs in MAHO processor 308. This processing produces one or more MAHO measurement values.

Figure 5:
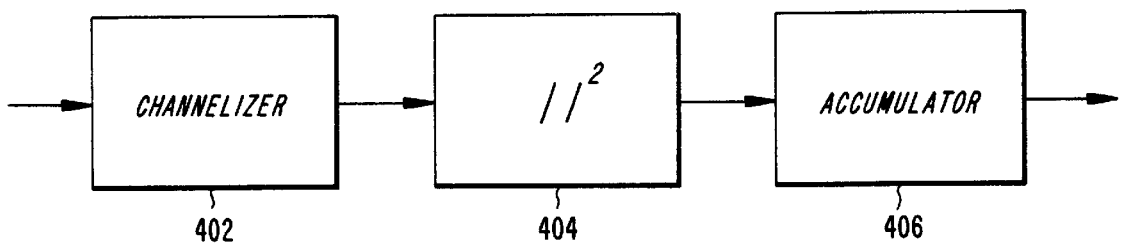
FIG. 5 is an exemplary block diagram of the MAHO processor of FIG. 4.

One exemplary embodiment of the MAHO processor 308 is illustrated in FIG. 5. The digital samples are passed through a channelizer 402, which extracts a particular channel to be measured. The selection of channels for measurement can be made based upon, for example, lists of channels received by the terminal over the air interface. Channelization can be performed by applying a digital filter to the digital samples. The digital filter is designed using standard techniques to filter out a particular frequency band, time slot, CDMA code, or some combination thereof. The channelized signal is magnitude squared in device 404 and accumulated in device 406, giving a signal strength measurement. For different channel measurements, the MAHO processor 308 can reprocess the buffered data using different channelizer settings, each of which correspond to a different channel to be measured. Alternatively, parallel MAHO processors can operate on the buffered data.

In a pure FDMA system, the channelizer 402 would pass only the desired frequency band. In a hybrid FDMA/TDMA system, the channelizer may also simply pass the desired frequency band. If it is important to select which time slot in a frame is measured, this can be controlled by either the MAHO collector 306 or the channelizer 402 itself. For example, selection of a particular timeslot or timeslots for measurement may be useful in a slot synchronized system. Moreover, this type of selection may be important when different timeslots correspond to different channels. For example, in systems where a control channel occupies one or more time slots in a frame and digital traffic channels occupy one or more time slots in the same frame, it may be the case that the control channel will have a higher received signal strength than the digital traffic channel. In such a situation, measurement on the timeslot(s) associated with the control channel would provide an inaccurate indication of the signal strength of the traffic channel or channels in the other time slots of that frequency. In a hybrid FDMA/CDMA system, the channelizer would include despreading using the desired channel's spreading code. Internal buffering of the frequency channelized signal within block 402 upstream of the despreader may be desirable, so that multiple despreading codes can be used. If symbol synchronization information is available, then one despread value per information symbol period can be produced. Otherwise, a despread value per chip period may be produced. A hybrid FDMA/TDMA/CDMA system would include combinations of the features described above, e.g., both despreading and possibly time slot selection.

Figure 6:
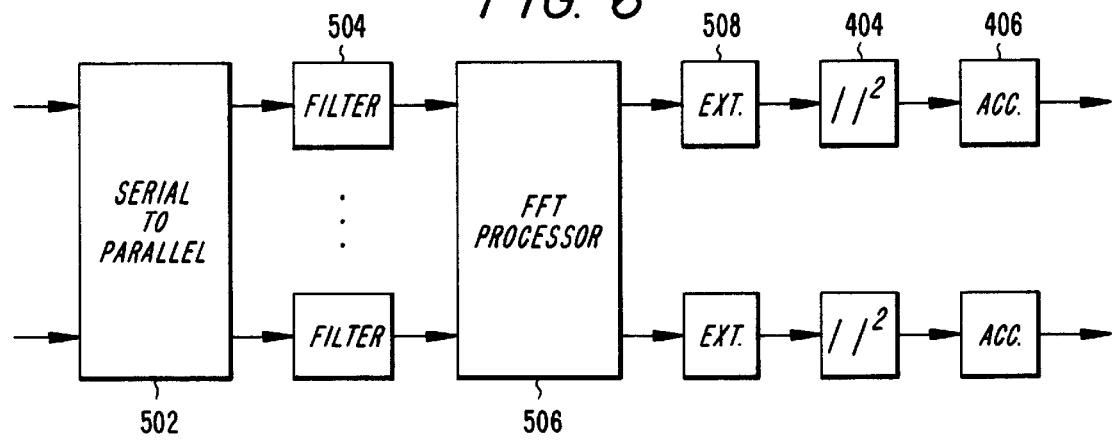
FIG. 6 is an exemplary block diagram of another embodiment of the MAHO processor.

A second exemplary embodiment of the MAHO processor 308 is illustrated in FIG. 6. This embodiment is based on filter bank theory, as discussed, for example, in chapter 4 of P. P. Vaidyanathan, Multirate Systems and Filter Banks, Englewood Cliffs, N.J.: Prentice-Hall, 1993. A serial-to-parallel converter 502 produces parallel streams of digital samples, which are filtered by a bank of filters 504. The filtered streams are processed by a Fast Fourier Transformer (FFT) processor 506, which produces frequency channelized data streams for a plurality of frequencies. Depending on the multiple access scheme, extraction units 508 may be needed for further channelization.

For example, in a pure FDMA system, extraction units 508 may be omitted. In a hybrid FDMA/TDMA system, the extraction units 508 may also be omitted, if it is not important which time slot is measured or if the MAHO collector 306 is controlled to take data from the desired time slot. Otherwise, extraction units 508 may be used to keep only those samples which correspond to a desired time slot. An alternative would be to control which samples are passed to serial-to-parallel converter 502. In a hybrid FDMA/CDMA system, the extraction units 508 would include a despreading operation, to despread the spread spectrum signal with the code that corresponds to the channel to be measured. For measuring multiple channels in the same frequency band, the extraction units may include further buffering, allowing different despreading codes to be tried.

Other variations will be apparent to those skilled in the art. For example, a hybrid FDMA/TDMA/CDMA system according to the present invention would include elements of both the FDMA/TDMA and FDMA/CDMA systems. Despreading would be needed as part of the channelization, and time slot selection may be desired. The FFT processor 506 may only produce a subset of all possible outputs, should MAHO measurements not be needed on contiguous channels. As a result, the FFT processor 506 may be reduced in complexity.

When implementing the channelizer 402 or the FFT processor 506, there may be control information passed from the receiver as to what frequency was generated by frequency synthesizer 208. This frequency will determine where the channels to be measured occur in the spectrum of the MAHO apparatus input signal.

The MAHO apparatus may also be applied at other points in the receiver chain. For example, it may be applied just after the LNA 204, before mixer 206.

The above-described exemplary embodiments are intended to be illustrative in all respects, rather than restrictive, of the present invention. Thus the present invention is capable of many variations in detailed implementation that can be derived from the description contained herein by a person skilled in the art. Although the exemplary embodiments of the present invention described above relate to applications wherein multiple access schemes are used which do not have a TDMA component which would allow an idle mobile receiver to take MAHO measurements, those skilled in the art will appreciate that other applications are also possible. For example, in a TDMA system wherein a mobile station is receiving at a higher rate to increase the bandwidth in the downlink, it may be the case that all of the timeslots in each frame are used to support communication with that mobile station. For example, in IS-136, a triple rate downlink channel may be provided by transmitting information to the mobile station in all six time slots. This may be desirable, for example, for data communications, e.g., connections between the mobile station and the Internet. In such a situation, the present invention can be used to provide MAHO measurements even though the mobile station is fully occupied with information signal reception.

Another example might be full rate TDMA communications wherein the mobile station is only receiving on some subset of the time slots in each frame, but where it is desirable to power down its receiver during idle time slots and use the present invention to perform MAHO measurements. All such variations and modifications are considered to be within the scope and spirit of the present invention as defined by the following claims.

What is claimed is:

1. A communications terminal comprising:
   means for receiving and processing a radio signal to produce a multichannel signal including a plurality of channels and to produce a demodulated signal corresponding to a single channel;
   means for producing digital samples of said multichannel signal;
   means for removing at least one channel from said digital samples of said multichannel signal, wherein processing means make energy measurements on said at least one channel, wherein said single channel and said at least one channel are associated with different frequencies.

2. The communications terminal of claim 1, wherein said means for receiving and processing further comprises a splitter for producing two copies of said radio signal.

3. The communications terminal of claim 2, wherein said means for receiving and processing further comprises a narrowband filter for receiving a first copy of said radio signal and for passing a subset of frequencies associated with said single channel.

4. The communications terminal of claim 2, wherein said means for receiving and processing further comprises an image rejection filter for receiving a second copy of said radio signal.

5. The communications terminal of claim 1, wherein said means for producing digital samples is an A/D convertor.

6. The communications terminal of claim 1, wherein said means for removing said at least one channel further comprises a channelizer.

7. The communications terminal of claim 1, wherein said at least one of said plurality of channels has an FDMA component.

8. The communications terminal of claim 1, wherein said at least one of said plurality of channels has a TDMA component.

9. The communications terminal of claim 1, wherein said at least one of said plurality of channels has a CDMA component.

10. The communications terminal of claim 1, wherein said means for removing said at least one channel further comprises a fast fourier transform processor.

11. The communications terminal of claim 10, wherein said means for processing said digital samples further comprises at least one extraction device downstream of said fast fourier transform processor for further separating said at least one of said plurality of channels from said digital samples.

12. The communications terminal of claim 11, wherein said at least one extraction device operates to separate a desired timeslot from an output of said fast fourier transform processor.

13. The communications terminal of claim 11, wherein said at least one extraction device operates to correlate an output of said fast fourier transform processor with a spreading code.

14. The communications terminal of claim 1, further comprising:

means for transmitting said measurements over an air interface.

15. A method for making signal strength measurements on at least one channel comprising the steps of:

generating a first and a second copy of a received signal;

processing said first copy to obtain an information signal on a first channel; and processing said second copy to obtain signal strength measurements on said at least one channel, wherein said first channel and said at least one channel are associated with different frequencies.

16. The method of claim 15, wherein said step of processing said first copy further comprises the steps of:

filtering said first copy to obtain a frequency band of interest; and demodulating said first copy to obtain said information signal.

17. The method of claim 15, wherein said step of processing said second copy further comprises the steps of:

digitizing said second copy to produce digital samples;

buffering said digital samples; and processing said buffered digital samples.

18. The method of claim 17, wherein said step of processing said second copy further comprises the steps of:

selecting from among said buffered digital samples, those samples associated with said at least one channel;

determining magnitude squared values of said selected digital samples; and accumulating said magnitude squared values.

19. The method of claim 17, wherein said step of processing said buffered digital samples further comprises the step of:

channelizing said buffered digital samples based upon at least one of frequency, time and spreading code.

20. The method of claim 17, wherein said step of processing said buffered digital samples further comprises the step of:

processing said buffered digital samples using a fast fourier transform processor to separate said buffered digital samples by frequency.

21. The method of claim 20, further comprising the step of:

extracting said at least one channel from said processed buffered digital samples based upon a desired time slot.

22. The method of claim 20, further comprising the step of:

extracting said at least one channel from said processed buffered digital samples based upon a desired spreading code.

23. A communication terminal comprising:

a receiver for receiving a transmitted signal, processing said transmitted signal into a filtered signal and generating an information signal therefrom;

a splitter for generating a copy of said filtered signal; and a processor for generating energy measurements on at least two channels associated with different frequencies using said copy of said filtered signal.

* * * * *

UNITED STATES PATENT AND TRADEMARK OFFICE
CERTIFICATE OF CORRECTION

PATENT NO. : 6,473,602 B1  Page 1 of 1
APPLICATION NO. : 08/740306
DATED : October 29, 2002
INVENTOR(S) : Bottomley It is certified that error appears in the above-identified patent and that said Letters Patent is hereby corrected as shown below:

Claim 11, Column 7, line 19 should read as follows:
--said means for removing the at least one channel further comprises--

Claim 11, Column 7, line 22 should read as follows:
--least one channel from said digital--

Signed and Sealed this

Sixth Day of May, 2008

JON W. DUDAS
*Director of the United States Patent and Trademark Office*